Aug. 1, 1933.  H. W. HELMS  1,920,390

FIFTH WHEEL CONSTRUCTION

Filed June 13, 1928

Witness
H. C. McKnight

Inventor
Harry W. Helms
by Bulla & Bulla
his Attorneys.

Patented Aug. 1, 1933

1,920,390

UNITED STATES PATENT OFFICE 1,920,390

FIFTH WHEEL CONSTRUCTION

Harry W. Helms, Edgerton, Wis., assignor to Highway Trailer Company, Edgerton, Wis., a Corporation of Wisconsin Application June 13, 1928. Serial No. 284,925

1 Claim. (Cl. 280—125)

This invention relates to vehicles and has for its object to provide an improved fifth wheel construction in which the co-operating members are adapted to be maintained in self-centering relation with each other, being so designed as to dispense with the use of a king pin. It consists in certain features and elements of construction herein shown and described, as indicated by the claim.

In the drawing:—

Figure 1:
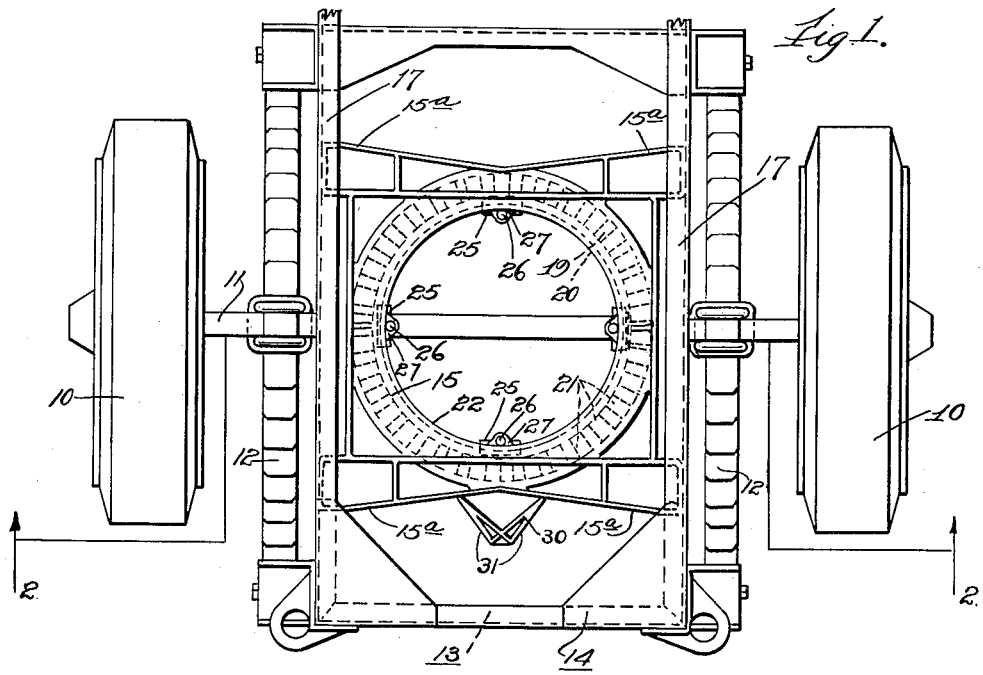
Figure 1 is a fragmentary plan view of a vehicle (with body removed) embodying my improved fifth wheel structure.
Figure 2:
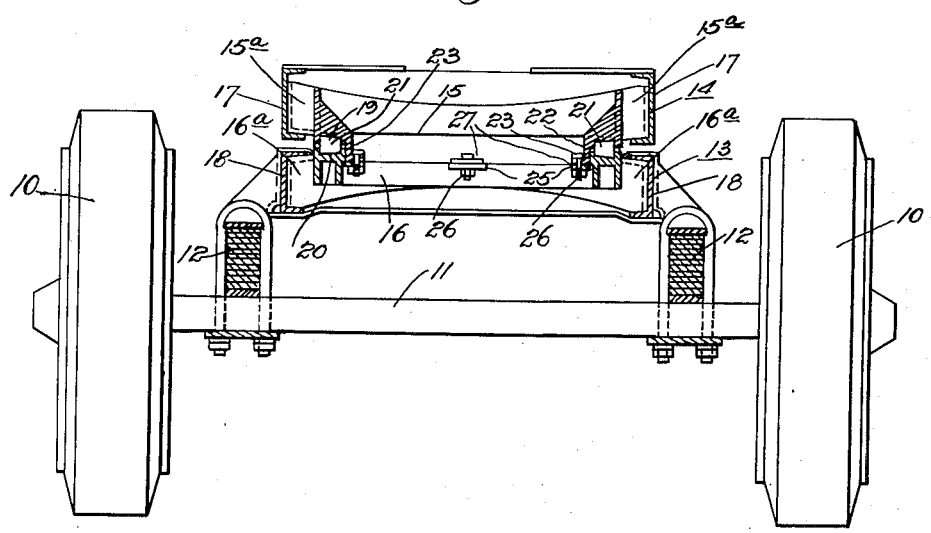
Figure 2 is a transverse vertical section through the vehicle frame taken substantially as indicated at line 2—2 on Figure 1.

As illustrated in the drawing, the steering end of the vehicle includes the usual wheels, 10, rotatably mounted on an axle, 11, yieldingly supporting on springs, 12, the sub-frame, 13, which is swivelly connected to the vehicle main frame, 14. The swivel connection of the sub-frame and main frame is provided by my improved fifth wheel structure which includes upper and lower co-operating members, 15 and 16, respectively. These fifth wheel members are preferably castings, and are formed with integral, laterally extending arms, 15a and 16a, respectively; the arms, 15a, of the upper member, 15, are secured to transversely spaced channel side members, 17, of the main frame, and arms, 16a, of the lower fifth wheel member, 16, are connected to the channel side members, 18, of the sub-frame. These are suitably reinforced by fillets and ribs, and cored out so that said fifth wheel members embody a minimum weight and maximum strength.

Aligned, annular grooved tracks or races, 19 and 20, are formed in the adjacent surfaces of the respective upper and lower fifth wheel members. These grooved tracks are inclined in opposite directions and embrace a plurality of radially disposed tapered rollers, 21, fitting the inclination of the tracks and having rolling contact therewith. These rollers materially reduce the friction between the fifth wheel members and permit the sub-frame to be freely turned in steering adjustment beneath the vehicle main frame. These inclined tracks are in the form of frusto-conical bearing areas in bearing contact with the tapered rollers, and due to their being disposed in opposite relation, they normally tend to hold themselves self-centered with respect to each other, dispensing with the use of a king pin usually employed to provide pivoting of one fifth wheel member on the other.

To definitely prevent possible displacement of one of the fifth wheel members with respect to the other and insure positive guidance in the rotative relation of said members, I provide an integral downwardly depending, annular flange, 22, formed about the inner circumference of said upper member, 15, and positioned in telescopic relation to the lower member, 16, with said flange in sliding contact with the inner surface of a vertical upright flange, 23, which serves as the inner guard for the rollers on track, 20.

To prevent vertical separation or displacement of the fifth wheel members, due to bumping or vibration of the vehicle, retaining shoes, 25, are spaced 90° apart around the inner opening of said fifth wheel members, and are secured in lapping relation to the under edge of flange, 23, of member, 16, being fastened by bolts, 26, in the lugs, 27, which extend inwardly from the telescoping flange, 22, of the upper member, 15.

A stop member, 30, is carried on the main frame, 14, and is preferably cast integral with the upper fifth wheel member, 15, and arms, 15a, at the longitudinal center of the vehicle. Said stop extends downwardly with oppositely extending stop faces, 31, arranged to be engaged by the adjacent side members of the sub-frame, 13, for limiting the swiveling movement of said sub-frame with respect to the main frame, thus preventing the wheels, 10, from striking the side members of the main frame which is apt to cause damage to one or the other.

It will of course be understood that my invention is capable of various modifications which may provide the advantages obtained by structure herein described, which is chosen as illustrative and is not to be taken as limiting the scope of my invention except as indicated by the appended claim.

I claim:—

In a road vehicle comprising a main frame and a sub-frame associated with an axle, a fifth wheel structure swivelly connecting the main frame and the sub-frame and comprising a pair of cooperating members having opposed concentric annular portions whose diameter is nearly as great as the width of the sub-frame to ensure stability of the main frame thereon, the main frame comprising side rails spaced apart with the upper annular member of the fifth wheel structure disposed between them and supported by integral transverse beam elements with vertically disposed web portions secured directly to said side rails and disposed mainly between the upper and lower bounding planes of said rails, the lower member of the fifth wheel being similarly secured to the side rails of the sub-frame substantially within the upper and lower bounding planes of the same, whereby the lower side of the main frame is supported closely adjacent the upper side of the sub-frame.

HARRY W. HELMS.